June 13, 1972 R. H. CUSHMAN 3,669,806

BONDING PRESS HAVING IMPROVED SUPPORT BASE STRUCTURE

Filed Dec. 28, 1970 2 Sheets-Sheet 1

INVENTOR
R. H. CUSHMAN
BY [signature]
ATTORNEY

United States Patent Office 3,669,806
Patented June 13, 1972

3,669,806

BONDING PRESS HAVING IMPROVED SUPPORT BASE STRUCTURE

Robert Holbrook Cushman, Huntingdon Valley, Pa., assignor to Western Electric Company, Incorporated, New York, N.Y.

Filed Dec. 28, 1970, Ser. No. 101,588
Int. Cl. B32b *31/00;* B02c *11/08*
U.S. Cl. 156—580 6 Claims

ABSTRACT OF THE DISCLOSURE

A bonding press is disclosed which comprises a ram, a support base to carry components to be bonded, a platten which moves the support base towards the ram, a diaphragm which moves the platten in response to applications of fluid pressure and a cantilever mounted beam having its free end attached to the support base.

BACKGROUND OF THE INVENTION

(1) Field of the invention

This invention relates to devices for joining materials together and pertains in particular to those in which the materials are joined by a thermal compression bond.

(2) Description of the prior art

Applications for thermal compression bonds abound, but are particularly important in fabricating solid state devices such as monolithic, multisection, high frequency crystal filters, integrated circuits and other similar products in which bonding presses can advantageously be used. Conventionally, a bonding press includes a ram and a support base for holding the components to be bonded. Typically, thermal compression bonds are obtained in the press by applying heat to the components while pushing them against the ram with a predetermined amount of force.

Either the ram or the supporting base, or both, may move and either or both may be heated. In one known arrangement, however, the ram is heated and the support base reciprocates over a precise path so that movement of the support base in one direction presses the components against the ram, while movement in the other direction brings separation. Precise control of the rate at which thermal and mechanical energy are applied to the component, as well as peak magnitudes and phase relationships thereof, are essential for good bond quality. Therefore, when making many bonds at one time, each must be pressed against the ram for the same amount of time and with the same amount of force to obtain uniform results. Thus, when the support base is transporting multiple components for simultaneous bonding, its movement must be precisely controlled to be sure that all of the components engage and disengage the ram at the same time and that each receives the same amount of bonding force.

Obtaining satisfactory control of support base movement, however, has heretofore proved to be difficult. For example, if lateral movement with the respect to the major direction of movement occurs as the support base travels, some part of the support base may drag against the press structure. If dragging occurs, friction forces will be imposed on the support base at the point of contact. When the friction forces are unequally imposed, i.e., at one corner, the relative positions between the support base and the ram will change. Consequently, the support base will be skewed with respect to the ram and the components will not arrive at the ram simultaneously. As a result, nonuniform bonds will occur.

Heretofore, many arrangements to eliminate interference with support base movement have been proposed such as the use of springs or bearings to guide travel. None, however, has yet proved to be entirely satisfactory. Specifically, the high bonding temperatures i.e., in the range of 1100 degrees F. to 1300 degrees F. generally have an adverse effect on bearing or spring arrangements. When ambient temperature becomes that hot, the structure of the bonding press tends to distort due to unequal thermal expansion of its parts. As distortion increases, the springs or bearings tend to stick, drag or otherwise function erratically. Consequently, the support base no longer moves as intended. Occasionally, part of the bonding force can be used to overcome nonuniform movement of the support base. Too often, however, the portion of the bonding force needed for correction becomes so great that the unexpanded portion is too small to satisfy the requirements of the desired bond.

Accordingly, one object of this invention is to achieve unrestricted support base movement and identical support base travel in successive bonding operations.

Another object of this invention is to facilitate the adjustment of the relative positions of the support base and ram with respect to each other.

Still another object of this invention is to achieve rapid initiation of support base movement.

SUMMARY OF THE INVENTION

In accordance with a preferred embodiment of this invention a ram, a support base, a platten and a diaphragm arranged to fluctuate in response to fluid pressure are combined to form a bonding press. More particularly, the platten is mounted on one side of the diaphragm and is arranged to move in a reciprocal path in response to diaphragm fluctuations induced by appropriately applied fluid pressure. Similarly, the support base is adapted to accommodate components to be bonded, is disposed between the platten and the ram and is arranged to move the components into contact with the ram in response to reciprocal movement of the platten.

According to one feature of this invention, unrestricted support base movement and identical support base travel is achieved in successive bonding operations by attaching the support base to the free end of a cantilever mounted beam.

According to another feature of this invention, easy adjustment of the relative positions of the support base and the ram with respect to each other is achieved by including the support base in a structure having two parallel plates separated by a pivot member and joined by a plurality of leveling screws.

According to another object of this invention, rapid initiation of support base movement is achieved by transmitting moving force to the support base through a pressure responsive diaphragm and supplying pressure initially to said diaphragm around its periphery.

DETAILED DESCRIPTION

Figure 1:
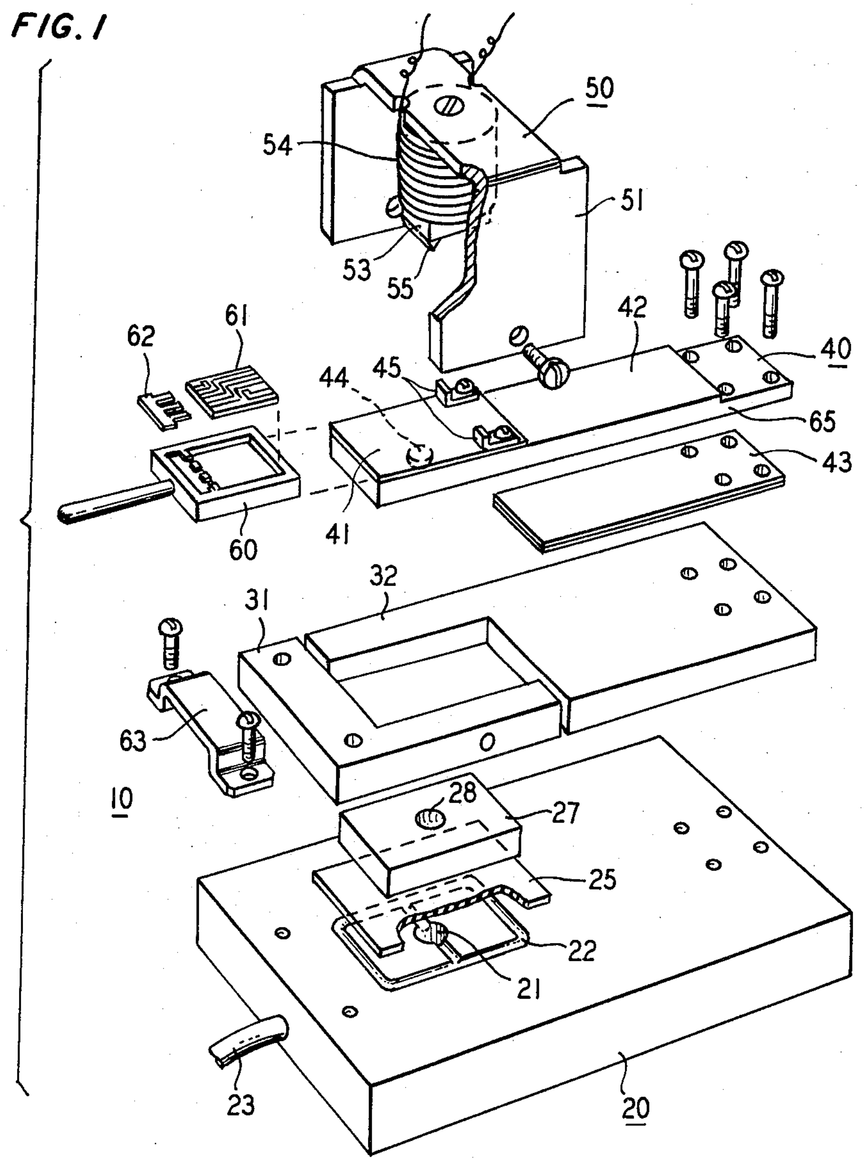
FIG. 1 is an exploded view of a bonding press made in accordance with this invention.

Referring to FIG. 1, a bonding press 10 is disclosed which comprises a fluid plate 20, a diaphragm 25, a platten 27, a frame assembly 30, a support base assembly 40 and a ram assembly 50. In the arrangement disclosed, the fluid plate 20 supports the other components and the support base assembly 40 and the ram assembly 56 cooperate to provide a bonding function in response to appropriate movement of the diaphragm 25 and the platten 27.

Figure 3:
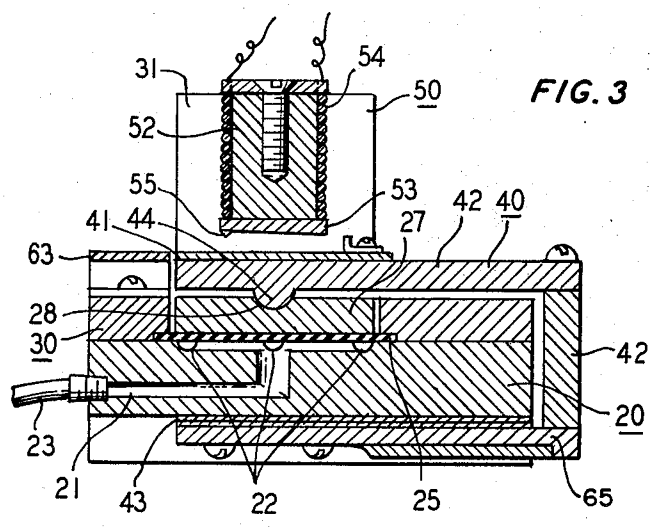
FIG. 3 is a side elevation view of a modified form of the bonding press shown in FIG. 2 as taken along the lines 3—3 and illustrates an alternate cantilever beam design.

The fluid plate 20 is a rectangular block made of a material such as aluminum and, as shown in FIGS. 1 and 3, includes a number of fluid passages 21 and 22. The fluid passage 21 interconnects a fluid hose 23 located on the exterior of the fluid plate 20 with the fluid passages 22. The fluid passages 22 are partially formed by one surface of the diaphragm 25 and are advantageously distributed around the perimeter thereof.

The diaphragm 25 lies in direct contact with the fluid plate 20 and is held in place by the frame assembly 30. Satisfactory results have been achieved by fabricating the diaphragm 25 from a sheet of flexible nonporous material such as, rubber, plastic or the like. Advantageously, the frame assembly 30 comprises a front frame member 31 and a rear frame member 32. Both frame members are advantageously made from a material such as stainless steel, are substantially L-shaped and include a number of mounting holes. As best seen in FIGS. 1 and 3, both are rigidly attached to the fluid plate 20, as by threaded screws, so as to clamp the edges of the diaphragm 25 against the fluid plate 20 and are so arranged with respect to each other to form a frame or pocket suitable for accommodating the platten 27.

The platten 27 is a relatively small rectangular block which can be advantageously made from a material such as stainless steel and is dimensioned to fit within the frame or pocket formed by the front frame member 31 and the rear frame member 32. As shown in FIGS. 1 and 3, the platten 27 rests on the diaphragm 25 and on one side includes a depressed hollow or socket 28 which engages the support base assembly 40.

The support base assembly 40, as best seen in FIG. 1, advantageously includes a support base 41 and a beam 42. Both are advantageously made of a material such s stainless steel and the beam 42 has a rectangular cross section. Two alternate beam structures are illustrated, and, as shown in FIGS. 1 and 3, the beam 42 is rigidly attached to the fluid plate 20 at one end, as by a plurality of threaded screws. As illustrated in FIG. 3, it is spaced therefrom a predetermined distance by a plurality of shims 43. As best seen in FIG. 3, the cross section of the base of the beam 42 is diminished in the plane of vertical travel near the point of attachment to the fluid plate 20 so as to form a solid hinge 65. The underside of the beam 42 includes a raised bump or dimple 44 which fits in the socket 28 in the platten 27.

In practice, the beam 42 may have compact dimensions. For example, a width of two inches, a thickness of 1/8 inch with a 1/32 inch diminuation at the solid hinge and a free length of six inches has successfully developed bonding forces in the range of one to ten pounds in response to air pressures of 0.5 to 3 p.s.i.

In an alternative form, the beam 42 may be folded to save space. As shown in FIG. 3, for example, it has a substantially U-shaped form and is attached to the underside of the fluid plate 20. With this arrangement, the advantages of a long cantilever are achieved in a compact structure. Moreover, compensation for thermal expansion can readily be achieved; i.e., the top and bottom portions can be made of different materials.

Figure 5:
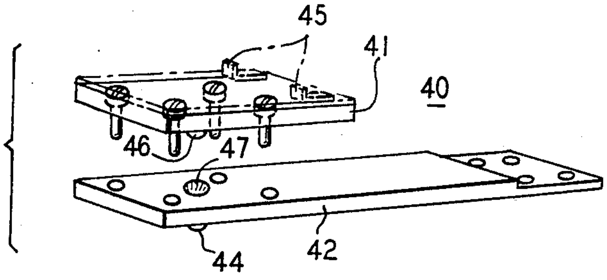
FIG. 5 is a perspective view of an alternative form of support base assembly.

The support base 41 is adapted to receive a component carrier 60 and advantageously includes guide stops 45. It can be rigidly attached to the beam 42 or as shown in FIG. 5, it can merely be supported on the beam 42 by four adjusting or leveling screws which seat in sockets in the beam 42 and locate it precisely in place. With the alternative arrangement shown in FIG. 5, the support base 41 and the beam 42 may advantageously include a dimple 46 and a socket 47, respectively, which cooperate with leveling screws to hold the support base 41 in a fixed but readily adjustable position with respect to the beam 42 and the ram assembly 50. With the arrangement shown, it is readily apparent that one support base is easily and simply substituted for another.

The ram assembly 50 includes a support bracket 51, a heatable core 52 having an anvil 53 at one end and a heating coil 54 wound around the core 52. One end of the core 52 is rigidly attached to the support bracket 51 as by a screw and the other end is attached to the anvil 53. The core 52, as well as the anvil 53, is designed to be heated and to be maintained at bonding temperatures in the range of 1100 to 1300 degrees F. Advantageously, both are made of a material such as stainless steel.

The anvil 53 is designed to press against components mounted in the carrier 60 such as, for example, an integrated circuit 61 and beam leads 62 as illustrated in FIG. 1. In such an application, the anvil 53 is advantageously equipped with a bonding wedge 55 which is located with respect to the stops 45 so that when the integrated circuit 61 and the leads 62 are transported by the carrier 60 into position thereunder, it will be disposed above the desired bonding point between the circuit 61 and the leads 62. As best seen in FIGS. 1 and 3, a sheet metal bracket 63 is mounted on the fluid plate 20 adjacent to the front frame member 31 so as to facilitate positioning of the carrier 60 beneath the wedge 55.

Figure 4:
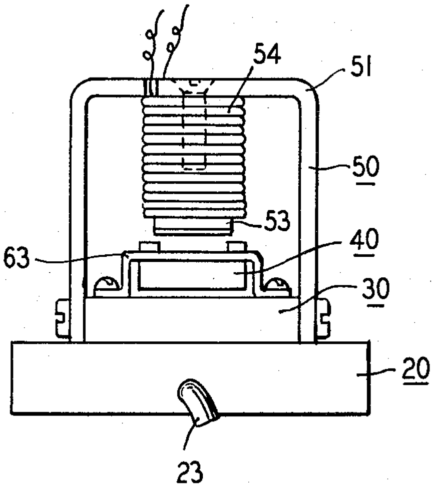
FIG. 4 is an end elevation view of the bonding press shown in FIG. 2.

The support bracket 51 has a U-shaped configuration and is advantageously made of a material such as stainless steel. As illustrated in FIGS. 1 and 4, it is rigidly attached to the frame assembly 30 as by mounting screws. Where mounting screws are used, oversize holes may be drilled in the support bracket 51 so that the anvil 53 can easily be adjusted with respect to the support base 41.

In operation, the anvil 53 is first brought to a working or bonding temperature. Next, a carrier 60 transports components to be bonded to a position beneath the anvil 53. For convenience, the stops 45 are used as guides so that accurate positioning can be quickly and easily obtained.

When the components to be bonded are properly positioned, a fluid such as air is introduced under pressure into the fluid passages 21 via the fluid hose 23. As the fluid reaches the fluid passages 22, the diaphragm 25 is lifted from the surface of the fluid plate 20. Particularly rapid lifting action is achieved because fluid is immediately distributed around the periphery of the diaphragm 25 so that, as the edges lift, fluid can rapidly move over the surface of the fluid plate 20 and thereby quickly bring pressure to bear over the entire surface of the diaphragm 25.

As the diaphragm 25 is forced away from the fluid plate 20, it lifts the platten 27 which, in turn, presses against a beam 42. As best seen in FIG. 3, pressure exerted by the platten 27 is transmitted to the beam 42 through the dimple 44 and socket 28 combination. The pivoting function of that combination insures that equal pressure will be applied to the support base 41 throughout beam travel.

As the pressure increases, the beam 42 deflects at the solid hinge 65 and the support base 41 moves towards the anvil 53 until the components to be bonded are pressed against the heated wedge 55. The duration of contact between the components and the wedge 55, as well as the amount of force exerted, is controlled by regulating the fluid from the fluid hose 23. After the desired force has been exerted for the required time, fluid pressure is released thereby allowing the beam 42 to return to its normal position. The bonding operation is completed by removing the carrier 60.

In the embodiment disclosed, the support base 41 moves along a precisely repeatable path in which it will encounter no impediments or restrictions. Its travel is over an arc defined by the length of the beam 42 and its relative position with respect to the anvil 53 can easily and precisely be adjusted by changing the position of the support bracket 51 as described or, where a support base assembly of the type illustrated in FIG. 5 is used, by adjusting the leveling screws to force the support base 41 to appropriately pivot about the dimple 46. Moreover, the dimple and socket arrangement in cooperation with the leveling screws shown in FIG. 5 can be used to introduce controlled automatic compensation for nonuniformity in carrier construction or in the work pieces being bonded. Consequently, either the ram assembly 50 or the support base assembly 40 can be replaced in a bonding press 10 easily and conveniently.

Figure 2:
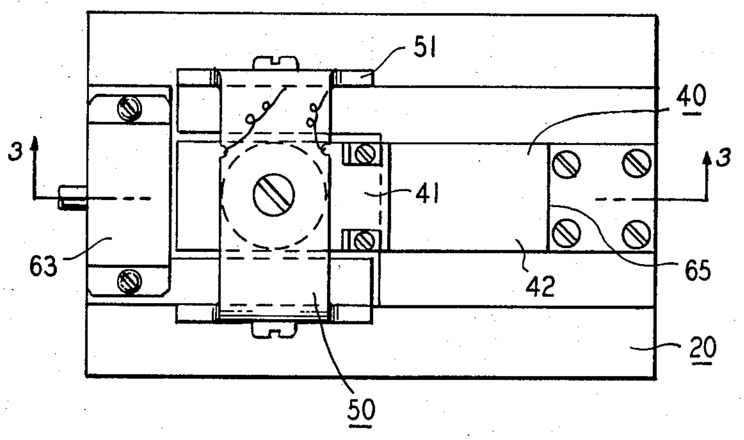
FIG. 2 is a plan view in assembled form of the bonding press shown in FIG. 1.

The solid hinge 65 facilitates movement of the beam 42 in its intended direction of travel and is achieved by diminishing the cross section of the beam 42 in the direction of travel. Such cross-sectional diminuation, however, does not affect lateral stability. That is, the wide dimension of the beam 42, as shown in FIGS. 1 and 2, allows no lateral movement thereby repeatable bonding cycles are assured.

In summary, a bonding press has been disclosed in which the support base achieves unrestricted movement and identical travel in successive bonding operations. While only one embodiment of the invention has been disclosed, it is illustrative of the principles of the invention and other embodiments thereof which fall within the scope of the invention will readily occur to those skilled in the art.

What is claimed is:

1. A bonding press for joining components by thermal compression bonds including an anvil, a diaphragm arranged to fluctuate in response to appropriate applications of fluid pressure on one side thereof, fluid conducting means for transporting fluid to said diaphragm, a platten attached to the other side of said diaphragm and arranged to reciprocate over a predetermined path in response to fluctuations of said diaphragm and a support base assembly located between said platten and said ram, said support base asesmbly including means for accommodating components to be bonded and being arranged to transport said components into contact with said ram in response to reciprocal movement of said platten characterized in that said support base assembly includes a support base attached to the free end of a cantilever mounted beam whereby support base movement will be unrestricted and support base travel will be identical in successive bonding operations.

2. A bonding press in accordance with claim 1 wherein said support base assembly includes two parallel members separated by a pivot and joined by locating means for adjusting the position of one member with respect to the other about said pivot.

3. A bonding press in accordance with claim 2 wherein said locating means comprises a plurality of equally spaced leveling screws.

4. A bonding press in accordance with claim 1 wherein said cantilever beam has, in its major direction of intended travel, a diminished cross section adjacent to its fixed end to facilitate deflection.

5. A bonding press in accordance with claim 4 wherein said beam has a folded configuration.

6. A bonding press in accordance with claim 1 wherein said fluid conducting means includes fluid passageways disposed around the periphery of said diaphragm.

References Cited

UNITED STATES PATENTS

| | | | |
|---|---|---|---|
| 3,376,184 | 4/1968 | Ritchey et al. | 156—580 |
| 3,433,699 | 3/1969 | Rumble | 156—580 |

DOUGLAS J. DRUMMOND, Primary Examiner

U.S. Cl. X.R.

100—93 P, 269; 156—583